UNITED STATES PATENT OFFICE.

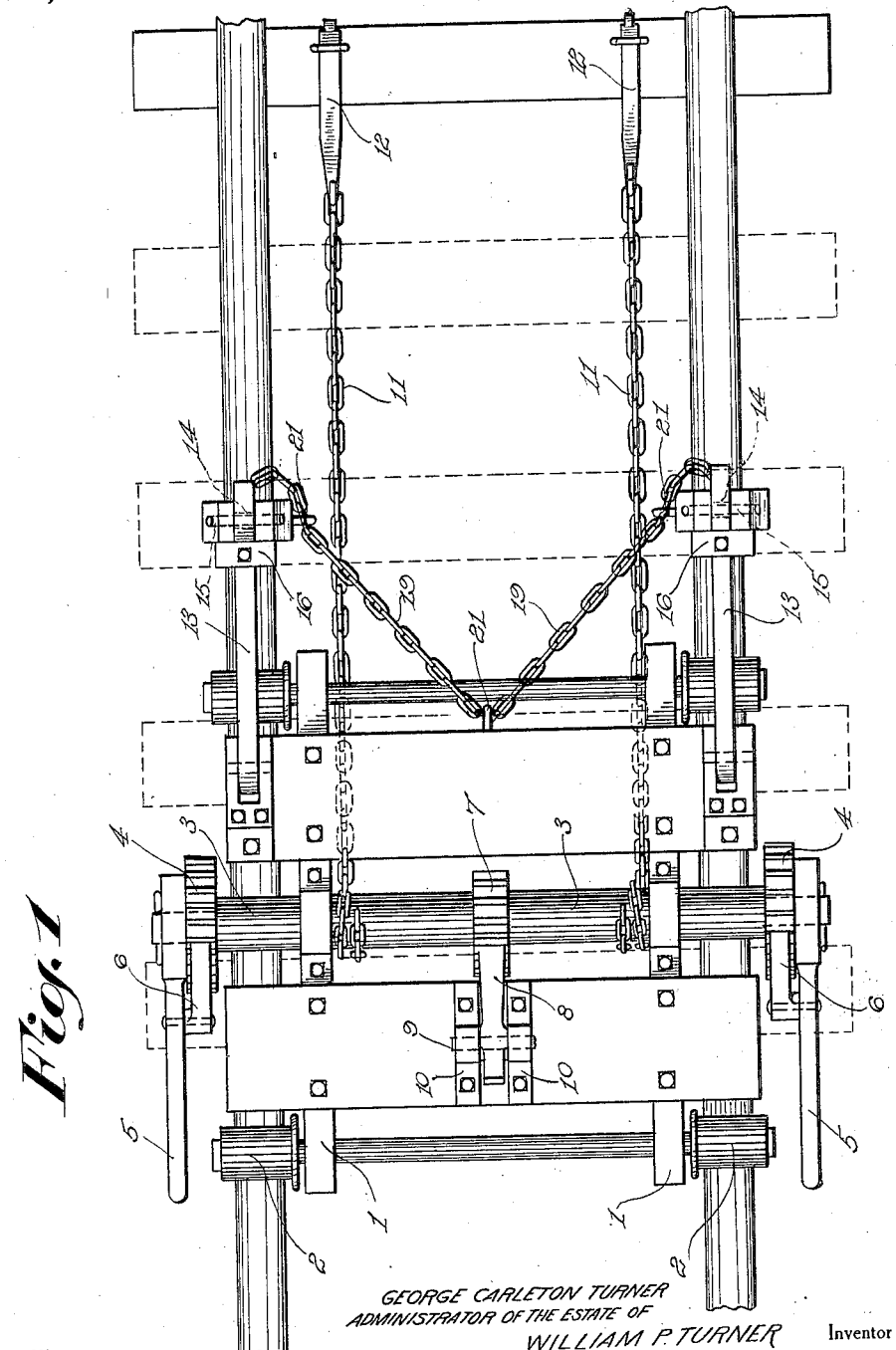

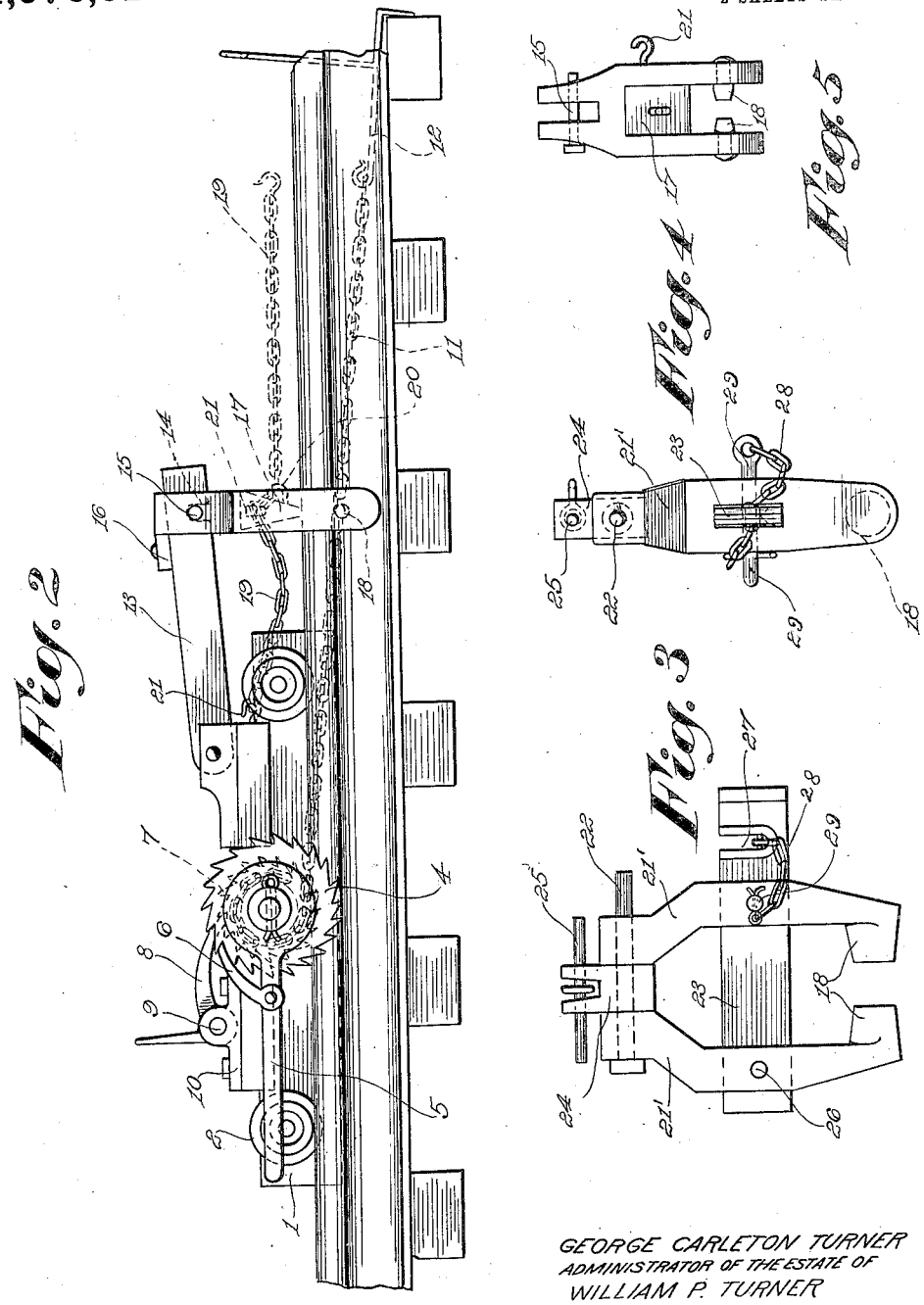

WILLIAM P. TURNER, DECEASED, LATE OF STICKNEY, NEW BRUNSWICK, CANADA, BY GEORGE CARLETON TURNER, ADMINISTRATOR, OF FLORENCEVILLE, NEW BRUNSWICK, CANADA, ASSIGNOR, BY DIRECT AND MESNE ASSIGNMENTS, TO JOSEPH A. GRANT AND GEORGE FRED TURNER, BOTH OF STICKNEY, NEW BRUNSWICK, CANADA, AND FRED T. PERRY.

COMBINATION GRAB AND TIE-SPACER.

1,076,615.   Specification of Letters Patent.   Patented Oct. 21, 1913.

Application filed November 20, 1912. Serial No. 732,490.

*To all whom it may concern:*

Be it known that WILLIAM P. TURNER, deceased, late a subject of the King of Great Britain, residing at Stickney, Province of New Brunswick, Canada, did invent certain new and useful Improvements in Combination Grabs and Tie-Spacers; and I, GEORGE CARLETON TURNER, administrator of the estate of the said WILLIAM P. TURNER, do hereby declare that the following is a full, clear, and exact description of the invention, such as will enable others skilled in the art to which it appertains to make and use the same.

The invention to be hereinafter described relates to a combination grab and tie spacer.

In order to more clearly disclose the construction, operation, and use of the invention, reference should be had to the accompanying drawings forming part of the present application.

Throughout the several figures of the drawings like reference characters designate the same parts.

In the drawings: Figure 1 is a top plan view of the invention; Fig. 2 is a side elevation of the same, with the grab inoperative; Fig. 3 is a front view of a modified form of grab; Fig. 4 is a side elevation of the same; and Fig. 5 is a front view of the grab of Figs. 1 and 2.

The main objects of the invention are to provide a simple, efficient, durable, economical, and compact grab and tie spacer which may be readily and quickly applied and used, and one which may be manufactured in large quantities at a moderate cost.

Referring to the drawings in detail, 1 indicates a frame carried on rollers or small wheels 2 adapted to run on the rails of the track. On this frame is journaled a winding drum 3 provided with ratchet wheels 4 at its opposite ends. To rotate the winding drum hand levers 5 with pivoted pawls 6 are provided, one lever being journaled on each end of the winding drum.

To prevent reverse or unwinding action of the drum a third ratchet 7 is fixed thereto at a point between its ends, and an elbow lever 8 with one arm acting as a pawl is fulcrumed at 9 in a suitable bracket or plate 10 carried by the frame 1, and coöperates with the ratchet 7. From the drum 3 extend two chains 11 each provided with a tie hook or grip 12 adapted to engage one or the other end of the tie. By operating the drum 3 to wind up the chains 11, after one or the other or both grips 12 have been connected to the tie, the tie may be drawn into proper position, as will be clear. It is necessary, of course, to overcome the reaction of the machine as the drum is operated. Otherwise, the machine would simply move along the rails toward the tie, leaving the tie unmoved. To prevent this, two arms 13 are pivotally connected to the forward part of the frame 1 at points above the rails of the track and rail grabs are removably connected to these arms. The free end of each arm has a notch 14 formed in its under edge to receive a pin 15 passed through the head of the grab. On the back of the arm 13 is secured a stop plate 16 adapted to engage the rear upper edges of the two grab members and limit their upward swing, as clearly shown in Fig. 2. It is clear, of course, that the grab body may comprise either two separate members or a single substantially U shaped member. A cross bar 17 connects the two grab members and is adapted to rest upon the top or tread surface of the rail head, when the grab is in the position of Fig. 1. Each member is provided with an inwardly directed lug 18 adapted to extend beneath the lower face of the rail head and lie very close thereto, though not quite in contact therewith, when the grab is in the position of Fig. 2. Thus, when it is desired to move the machine toward the tie which is to be shifted, it is only necessary to connect draft chains 19 to the hooks 20 and exert a forward pull.

These hooks are secured to the center of the cross bar 17 and just above the top surface of the rail head. This arrangement also places them at just about the center of the grab. Consequently, a forward pull exerted on these hooks will tend to draw the grabs straight forward along the rails without inclining them relatively to the rail head. This, of course, prevents the holding action which results from engagement between the lugs 18 and the under face of the rail head when the grab is slightly tilted. Normally, the draft chain is supported out of the way on hooks 21 on the frame and grab, as shown in Figs. 1 and 2.

The operation of the machine is as follows: The tie grips 12 will be connected to a tie, and the drum 3 will be operated to draw in or wind up the chains 11. This operation will tend to draw the tie and machine toward each other. As the frame 1 starts to move toward the tie, the arms 13 will tilt forward the upper ends of the grabs. The edge of bar 17, rested on the top of the rail head, will act as a fulcrum for the grab. Thus, the lower ends of the grab members will be caused to swing rearwardly and upwardly until their lugs 18 engage the under face of the rail head. Further forward pressure by the frame 1 and arms 13 simply increases the binding action between the rail head, on the one hand, and the bar 17 and lugs 18, on the other hand, as will be obvious. Thus, the frame 1 will be very securely locked against movement on the rails, toward the tie, as will be evident. Also, the locking will be entirely automatic and perfectly certain at all times, as will be clear.

In Figs. 1, 2, and 5 the grab shown is particularly adapted for use as a part of the machine, only.

In Figs. 3 and 4 a modified form of grab is shown which may also be used separately from the machine, as a lift or carrier for rails. This form comprises two separate grab members 21' each having a lateral slot about midway of its length and a lateral bore through its upper end. A connecting pin 22 is removably passed through the lateral bores and takes the place of the pin 15 in Figs. 1, 2, and 5. A plate 23 is passed through the lateral slots of the members 21 and takes the place of the connecting bar 17 in Figs. 1, 2, and 5. Now, if it is desired to use the grab of Figs. 3 and 4 as a rail carrier, it will simply be disconnected from the arm 13 and a spacing block 24 substituted for the arm. The block 24 is extended upwardly beyond the ends of the members 21' and is provided with a lifting handle 25 so arranged that two men may grip it at the same time, one from either side of the rail, as usual. The plate 23 is held in place by means of a fixed pin 26 and a removable pin 29 passed through the members 21 and through it, and may be provided with a notch 27 to receive the chain 28 of the removable pin 29, as shown in Fig. 4. The notch 27 is sufficiently narrow at its base to grip the chain and prevent its sliding, thus securely holding the pin 29 against accidental removal. The form of grab shown in Figs. 3 and 4 may be placed on the rail either by sliding longitudinally from one end, or may be placed thereon by simply removing pin 29 and sliding the members 21 apart until the lugs 18 may be passed down beside the rail head. Then the members are brought toward each other and the pin 29 again inserted.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In combination, a frame, means for movably supporting said frame on the rails of a track, tie drawing means carried by said frame, arms pivotally connected to said frame, rail grabs carried by said arms, and stop plates carried by said arms.

2. In combination, a frame, means for movably supporting said frame on the rails of a track, arms pivotally connected to said frame, rail grabs carried by said arms, and means for limiting the swing of said grabs.

3. In combination, a frame, means for movably supporting said frame on the rails of a track, arms pivotally connected to said frame, and grabs connected to said arms, each grab comprising a U shaped member, a bar connecting the branches thereof and adapted to rest on the top of the rail, and lugs extending inwardly from the branches to engage the under face of the rail head.

4. In combination, a frame, means for movably supporting said frame on the rails of a track, arms pivotally connected to said frame and provided with slots, rail grabs, and pivot pins extending through said grabs, and adapted to be seated in the slots of said arms.

5. In combination, a frame, means for movably supporting said frame on the rails of a track, arms pivotally connected to said frame, and grabs connected to said arms, each grab comprising a U shaped member, a bar connecting the branches thereof and adapted to rest on the top of the rail, lugs extending inwardly from the branches to engage the under face of the rail head, and draft means connected to said bar at the approximate center of said grab.

In witness whereof I have hereunto set my hand in the presence of two witnesses.

GEORGE CARLETON TURNER,
*Administrator of the estate of William P. Turner, deceased.*

Witnesses:
   J. BERTRAM PERRY,
   FRED T. PERRY.

Copies of this patent may be obtained for five cents each, by addressing the "Commissioner of Patents, Washington, D. C."